Patented Mar. 4, 1952

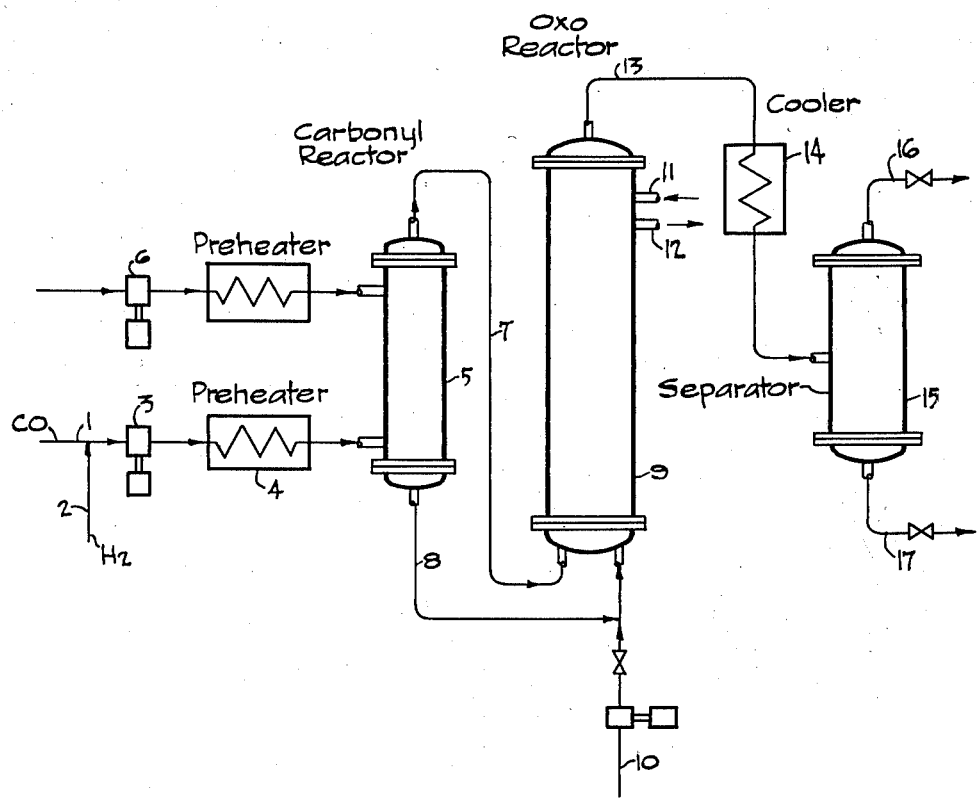

2,587,858

UNITED STATES PATENT OFFICE 2,587,858

PRODUCTION OF OXYGENATED COMPOUNDS

Aloysius I. M. Keulemans, Amsterdam, Netherlands, assignor to Shell Development Company, San Francisco, Calif., a corporation of Delaware Application May 1, 1948, Serial No. 24,669
In the Netherlands May 2, 1947

5 Claims. (Cl. 260—604)

This invention relates to a process for the production of oxygen-containing organic compounds by the catalyzed addition of carbon monoxide and hydrogen to various unsaturated parent compounds. More particularly the invention relates to an improvement in the method of carrying out the carbonylation of various materials by the Oxo Process.

The Oxo Process provides a method for the synthesis of various oxygenated compounds, including aldehydes, ketones, carbinols, acids and esters, by the catalyzed addition of carbon monoxide and hydrogen at the unsaturated bonds of various unsaturated organic compounds which may be considered the parent compounds of the oxygenated compounds produced. The parent compounds are usually compounds such as hydrocarbons, alcohols, aldehydes, ketones, acids, ethers, esters and amides having one or more ethylenic or acetylenic linkages; however, the process is not limited to the synthesis of oxygenated derivatives from such compounds since certain compounds having an unsaturated character, but no true double bond, e. g. acetals and olefin oxides, can also be carbonylated.

In the Oxo Process the carbonylation is caused to take place by treating the parent unsaturated compound to be carbonylated with a mixture of carbon monoxide and hydrogen in the presence of a suitable catalyst. Water and/or carbon dioxide may also be added in some cases to influence the course of the reaction. The preferred catalyst is cobalt. The temperature is usually above 130° C. and usually between 150° C. and about 200° C., e. g. 150–180° C. The pressure is usually above about 50 atmospheres. The contact time varies considerably with the severity of the conditions, the particular material being carbonylated, and the extent of reaction desired, but is generally between about 10 minutes and about 90 minutes.

The various types of compounds which may be carbonylated by the Oxo Process and the various reaction conditions applicable are known in the art, and since these do not form part of the invention it will suffice to refer to the prior art for further particulars regarding these and related matters. Therefore, reference is particularly made to the Petroleum Refiner 25, 503–504 (1946) and the following United States patents: 2,429,878, 2,402,133, 2,327,066, 2,003,477, 1,973,662.

In one method for carrying out the Oxo Process the cobalt catalyst in a finely divided condition is suspended as a slurry in the liquid unsaturated parent compound and carried with it to the carbonylation zone. This so-called slurry method involves the drawback that the catalyst suspension has to be transported at high pressures by means of pumps. These pumps are subjected to excessive wear. Also, the cataylst tends to become more and more finely divided with use and this gives rise to difficulties in filtration. Also, the catalyst tends to settle and large amounts of gas must be applied in order to maintain it in suspension.

In order to avoid the above-mentioned difficulties it has been tried to carry out the Oxo Process with a fixed bed of catalyst in the carbonylation reactor. In this method the catalytic metal is continuously removed from the reaction zone in solution in the reaction products. It was therefore not only necessary to feed catalytic metal to the reaction space in the form of a soluble cobalt salt, but it was also necessary to recover the cobalt from the reaction product. This recovery and the reconversion of the recovered cobalt to the soluble salt considerably complicated the process.

It has also been suggested to supply the catalyst to the carbonylation reaction zone in the form of cobalt carbonyl. The cobalt carbonyl reacts, after an appreciable induction period, and catalyzes the desired carbonylation through a series of reactions which is incompletely understood. The amount of cobalt that can be supplied in this manner using the known technique is, however, limited and the induction period is a distinct disadvantage.

In copending application Serial Number 24,668 of the same title and filed of even date herewith we have shown how the Oxo Process may be improved by continuously supplying catalyst to the carbonylation reactor with the carbon monoxide and hydrogen feed in the form of cobalt hydrocarbonyl. As pointed out in said application cobalt hydrocarbonyl is superior to cobalt carbonyl and by contacting the carbon monoxide and hydrogen in a proper ratio and under specific critical conditions with a cobalt-containing material in a separate reaction zone it is possible to produce concentrations of cobalt hydrocarbonyl in the gas mixture equivalent to several milligrams of cobalt per liter. Operation of the Oxo Process in the described manner results in an appreciable improvement from both the chemical and the engineering standpoints.

As pointed out in the said copending application the carbonylation reaction is carried out at temperatures in the range of 130° C. to about 200° C. and usually in the range of 150° C. to 180° C., whereas the maximum concentrations of cobalt hydrocarbonyl at pressures between 100 and 200 atmospheres are obtained when the temperature is between 95° C. and 110° C.±5° C. (depending upon the pressure), and the concentrations fall off sharply at temperatures above and below the critical temperature values. The concentration of cobalt hydrocarbonyl continuously charged to the carbonylation reactor according to the described method is therefore above the maximum concentration of cobalt hydrocarbonyl which can exist in the carbonylation reactor under the carbonylation conditions.

The results obtained with the above-described method of operation led us to the hypothesis that some product of the decomposition of the cobalt hydrocarbonyl is acting as a very active accelerator of the carbonylation reaction in this method. Experiments were made to test this hypothesis. Thus, if the hypothesis is correct a typical carbonylation reaction should take place only slowly or not at all if it is attempted to carry out the reaction under otherwise favorable conditions, but while decreasing the temperature, since by decreasing the temperature the concentration of cobalt hydrocarbonyl is increasing and cobalt hydrocarbonyl is not decomposing. This was found to be the case. Thus, when an active cobalt catalyst and an olefin were heated to 250° C. (a temperature slightly above that favorable for the formylation), carbon monoxide and hydrogen then added and the temperature slowly lowered to 100° C., only a slight reaction was observed. When the temperature was then gradually increased again a very rapid reaction set in.

Further experiments were made in which pure cobalt hydrocarbonyl prepared by a known method (J. A. C. S. 62, 1192–3, 1940), was tested in different concentrations as a catalyst for the carbonylation reaction. It was found that the carbonylation reaction is greatly accelerated when the concentration of cobalt hydrocarbonyl added is above that corresponding to the equilibrium concentration under the carbonylation reaction conditions, e. g. 130° C.–200° C. and 200 atmospheres. Regardless of whether or not the theory is correct, it is nevertheless found that the carbonylation reaction may be greatly accelerated by continuously charging to the carbonylation zone with the reactant feed a concentration of cobalt hydrocarbonyl greater than that corresponding to the equilibrium concentration under the carbonylation conditions. It was furthermore found that in this range of concentrations the rate of the carbonylation reaction depends considerably upon the concentration of the cobalt hydrocarbonyl applied. Thus, by applying a suitably large concentration of cobalt hydrocarbonyl we have obtained substantially complete carbonylation in five minutes whereas under comparable conditions using an active cobalt-on-kieselguhr catalyst over 30 minutes is required.

As pointed out in the above and in said copending application, the maximum concentration of cobalt hydrocarbonyl, obtainable by contacting carbon monoxide and hydrogen in a proper ratio with cobalt or a suitable cobalt compound, is obtained at 200 atmospheres pressure at the specific temperature of 110° C. (±5° C.) and is equivalent to about 5 milligrams of cobalt per liter of the gas mixture. At temperatures above and below this value the concentration falls off sharply to less than 1 milligram per liter. At other pressures the optimum temperature was found to vary somewhat as indicated by the maximum points shown in the following table:

| Pressure, Atmospheres | Temperature, °C. | Concentration, mg/liter |
| --- | --- | --- |
| 100 | 95 | 3.5 |
| 150 | 102 | 4.1 |
| 200 | 110 | 5.0 |

It has now been found that the concentration of cobalt hydrocarbonyl produced by the reaction of carbon monoxide and hydrogen in a suitable ratio with cobalt or a suitable cobalt-containing mass in a separate reaction zone and continuously fed to the carbonylation reaction zone with the reactant feed may be increased, and consequently an improved carbonylation rate may be realized, if the carbon monoxide and hydrogen are contacted with the cobalt-containing mass under suitable conditions in the presence of an olefin. The increased concentration obtained in this way is due to combination of part of the cobalt hydrocarbonyl with the olefin to form a soluble complex. In order to favor the complex formation and to avoid carbonylation the temperatures in this case are preferably somewhat lower, e. g. 80–105° C. although temperatures from 50° C. up to 110° C. may be employed. Regardless of the explanation, the carbonylation reaction can be greatly accelerated and the induction period usually observed can be eliminated.

Having pointed out and explained the more fundamental aspects of the method of the invention, we will now describe how the method of the invention is to be carried into effect in the actual operation of the Oxo Process. To aid in this description reference will be had to the accompanying drawing which is a flow diagram of the pertinent part of an Oxo plant arranged to allow the present method of operation, the important vessels being shown diagrammatically.

Referring to the drawing, carbon monoxide and hydrogen are introduced via lines 1 and 2, respectively, in such relative amounts that the mixture contains 55% hydrogen and 45% carbon monoxide. The mixture is compressed to 150 atmospheres by compressor 3 and is then preheated in preheater 4. The compressed and preheated mixture then enters near the bottom of the so-called carbonyl reactor 5. This so-called carbonyl reactor is filled with a mass consisting of cobalt deposited on granules of pumice. Octylene is pumped in by pump 6 and, after being preheated, is likewise charged to the so-called carbonyl reactor 5. The gas mixture is charged at a rate corresponding to a gaseous hourly space velocity of 2200 and the octylene is charged at a rate corresponding to a liquid hourly space velocity of 2.2. The temperature in the so-called carbonyl reactor is maintained at 80° C. by control of the preheat temperatures of the feeds. In the case illustrated the gases and liquid are separately withdrawn from 5 and passed by separate lines 7 and 8 to the conventional Oxo reactor 9 wherein the carbonylation reaction takes place. An additional amount may, if desired, be introduced via line 10 directly to the reactor. Reactor 9 is filled with 2–5 mm. pieces of catalyst containing about 8% by weight cobalt. The temperature in reactor 9 is maintained at 160° C. by means of suitable coils, the inlet and outlet of which are shown at 11 and 12. The product, as well as unused gas leaves the carbonylation reactor 8 via line 13, and, after cooling in cooler 14, is passed to a separator 15. The unused gases are withdrawn via line 16 and the liquid product containing aldehydes, alcohols and minor amounts of other oxygenated products is withdrawn via line 17. This product may be worked up and treated in any of the conventional manners to recover the various oxygenated products.

In the above the method of the invention has been described with reference to a specific case. It will be understood that the invention is not limited to this specific case. The ratio of hydrogen to carbon monoxide in the gas mixture employed may vary from about 1:1.5 to about 2:1, but mixtures on the hydrogen-rich side up to a ratio of about 1.8:1 are preferred. The process is not limited to the carbonylation of an olefin but is applicable with any of the unsaturated reactants hitherto used in the Oxo Process. In some cases where the unsaturated parent compound is not an olefin it may be desirable to add a small quantity, e. g. 5%, of an olefin, e. g. pentene, or to charge a small amount of an olefin via pump 6 and charge the total amount of the main other parent compound via line 10. In place of cobalt deposited upon pumice, any other source of cobalt which will give cobalt hydrocarbonyl under the described conditions and is not appreciably soluble in the olefin or other applied parent compound may be provided in reactor 5. Thus, cobalt may be present deposited on any other inert carrier substance such as kieselguhr, silica gel, alumina, crushed brick or the like, or it may be present in an alloy. Some substantially insoluble cobalt compounds such as chloride may also be used. In such cases it is advantageous to also provide an acceptor capable of binding the liberated acid radical. Suitable acceptors are, for example, finely divided copper, silver, or zinc. Thus, for example, a mixture of an insoluble cobalt salt with finely divided copper may be used. For the reasons indicated the temperature in reactor 5 is maintained between about 80° C. and 105° C. These temperatures, it will be noted, are considerably below those employed when the cobalt hydrocarbonyl is produced in the absence of the olefin. In the present method the pressure is also not so critical. Thus, any pressure above about 50 atmospheres may be employed. The preferred pressures are, however, between about 50 atmospheres and about 250 atmospheres.

*Example*

A mixture of carbon monoxide (45%) and hydrogen (55%) was preheated and passed through a so-called high pressure carbonyl reactor containing a mass consisting of 30% cobalt deposited on pumice stone. The gas rate was 2200 liters per liter of the cobalt-containing mass per hour. There was also passed through the so-called carbonyl reactor a $C_7$-$C_8$ hydrocarbon fraction containing 89% olefins and the remainder essentially inert paraffins at a rate of 2.2 liters per liter of the cobalt-containing mass per hour. The temperature in the so-called carbonyl reactor was maintained at 80° C. and the pressure was maintained at 150 atmospheres. The olefin and gas leaving the so-called carbonyl reactor were immediately passed to a separate conventional Oxo reactor filled with a carbonylation catalyst consisting of 8% cobalt deposited upon a pumice carrier. The throughput rate of the olefin in this reactor was 0.5 kg. per liter of catalyst per hour. The pressure was 150 atmospheres. The carbonylation reaction is exothermic and the temperature in the carbonylation zone was maintained at 160° C. (maximum) by suitable cooling. The mixture leaving the carbonylation reactor was passed to a high pressure separator, in which the unused gas was separated from the liquid. The liquid product was finally hydrogenated in a separate step at 180° C. and 200 atmospheres pressure with a nickel-on-kieselguhr catalyst. The final product contained 25% by weight of lower boiling hydrocarbons, 64% by weight of $C_8$-$C_9$ alcohols and 11% by weight of higher boiling oxygenated product. In this example the total amount of cobalt supplied to the carbonylation reactor with the reactant feed was about 16.6 grams per liter of the cobalt-containing mass per hour and the carbonylation reaction proceeded at a fast rate with no appreciable induction period. When the carbon monoxide and hydrogen are passed through the so-called carbonylation reactor under the same conditions, but in the absence of the olefin, the maximum amount of cobalt that can be introduced with the reactant feed is only about 4.6 grams per liter of the cobalt-containing mass per hour. If now, still in the absence of the olefin, the temperature in the so-called carbonyl reactor is increased to about 102° C. to give the maximum concentration of cobalt hydrocarbonyl obtainable by this method the amount of cobalt introduced with the reactant feed is about 9 grams per liter of the cobalt-containing mass per hour.

I claim as my invention:

1. In the synthesis of an oxygenated compound by the carbonylation of an olefin with carbon monoxide and hydrogen wherein the carbonylation is carried out in a carbonylation reactor with a fixed bed of cobalt catalyst, the improvement which comprises continuously supplying cobalt to the carbonylation reactor in the form of cobalt hydrocarbonyl.

2. In the production of an oxygenated compound by the carbonylation of an olefin with carbon monoxide and hydrogen with a fixed bed of cobalt catalyst in a carbonylation reaction zone, and wherein cobalt is continuously supplied to the reaction zone with the feed, the improvement which comprises continuously passing the hydrogen and carbon monoxide reactant feed in a ratio of from 1:1 to 1.8:1 through a cobalt-containing mass in the presence of the liquid olefin reactant feed in a first zone maintained under a pressure between 50 and 250 atmospheres and at a temperature of from about 50° C. up to about 110° C. whereby cobalt hydrocarbonyl is formed in the reactant feed in the substantial absence of carbonylation.

3. In the production of an oxygenated compound by carbonylation of an olefin with carbon monoxide and hydrogen wherein carbonylation with carbon monoxide and hydrogen is effected with the aid of a fixed bed of a cobalt catalyst in a carbonylation reaction zone, the improvement which comprises continuously passing the hydrogen and carbon monoxide reactant feed in a ratio between 1:1 and 1.8:1 through a cobalt-containing mass in the presence of a liquid olefin reactant feed in a separate zone maintained under a pressure between 50 and 250 atmospheres and at a temperature of from about 50° C. up to 110° C., whereby cobalt hydrocarbonyl is formed in the reactant feed in the substantial absence of carbonylation.

4. In the continuous production of an oxygenated compound by the carbonylation of an olefin with carbon monoxide and hydrogen with a fixed bed of cobalt catalyst in a carbonylation reaction zone, the improvement which comprises passing at least a part of the carbon monoxide and hydrogen reactant feed to the process, and at least a part of a liquid olefin reactant feed to the process, at a pressure between about 100 atmospheres and 200 atmospheres through a separate zone containing a cobalt-containing mass at a temperature between about 50° C. and about 110° C. which is below that causing carbonylation to take place, whereby cobalt hydrocarbonyl is formed in said olefin reactant feed.

5. In the continuous production of an oxygenated compound by the carbonylation of an olefin with carbon monoxide and hydrogen with a fixed bed of cobalt catalyst in a carbonylation zone, the improvement which comprises preventing the depletion of the cobalt catalyst in the carbonylation zone by supplying cobalt to said zone with the liquid reactant feed, said cobalt being in the form of cobalt hydrocarbonyl in the liquid olefin reactant feed.

ALOYSIUS I. M. KEULEMANS.

REFERENCES CITED

The following references are of record in the file of this patent:

UNITED STATES PATENTS

| Number | Name | Date |
|---|---|---|
| 2,327,066 | Roelen | Aug. 17, 1943 |
| 2,464,916 | Adams et al. | Mar. 22, 1949 |

OTHER REFERENCES

"Interrogation of Dr. Otto Roelen," PB-77705, pages 43 to 47, published by OTS, July 18, 1947; published in Great Britain (BIOS Final Report 447), May 6, 1946.